(12) United States Patent
Kumata

(10) Patent No.: US 6,704,148 B2
(45) Date of Patent: Mar. 9, 2004

(54) OMNIDIRECTIONAL VISUAL ANGLE SYSTEM AND RETAINER FOR THE SYSTEM

(75) Inventor: Kiyoshi Kumata, Kyotanabe (JP)

(73) Assignee: Sharp Kabushiki Kaisha, Osaka (JP)

(*) Notice: Subject to any disclaimer, the term of this patent is extended or adjusted under 35 U.S.C. 154(b) by 172 days.

(21) Appl. No.: 09/843,873

(22) Filed: Apr. 30, 2001

(65) Prior Publication Data
US 2001/0046080 A1 Nov. 29, 2001

(30) Foreign Application Priority Data
May 25, 2000 (JP) ........................................ 2000-154711

(51) Int. Cl.$^7$ .............................................. G02B 13/06
(52) U.S. Cl. ........................ 359/725; 359/618; 359/726
(58) Field of Search ................................. 359/725, 726, 359/618, 627, 633, 850

(56) References Cited

U.S. PATENT DOCUMENTS

| 4,281,343 A | * | 7/1981 | Monteiro ..................... 358/99 |
| 5,530,499 A | * | 6/1996 | Mori ........................... 354/64 |
| 6,028,719 A | * | 2/2000 | Beckstead et al. ........... 359/725 |
| 6,130,783 A | * | 10/2000 | Yagi et al. ................... 359/627 |
| 2002/0154218 A1 | * | 10/2002 | Loyd et al. .................. 348/151 |

FOREIGN PATENT DOCUMENTS

| JP | 6-29533 A | 10/1994 |
| JP | 9-252421 A | 9/1997 |
| JP | 2000-131737 A | 5/2000 |

* cited by examiner

Primary Examiner—Georgia Epps
Assistant Examiner—Tim Thompson
(74) Attorney, Agent, or Firm—Birch, Stewart, Kolasch & Birch, LLP

(57) ABSTRACT

A retainer is constructed of a retainer top section, a retainer body section and a retainer bottom section. Connecting portions of the sections are screwed by screws provided for the connecting portions with interposition of an O-ring. A mirror having a surface of revolution is mounted on the top portion of the body section. The bottom section is assembled with a mounting base for movably mounting an image pickup device and with a fixture for fixing the image pickup device to the mounting base. There is thus obtained a compact omnidirectional visual angle system, which has a waterproof function and does not interrupt the visual angle and in which the retainer structure of the mirror and the image pickup device, the distance therebetween can be varied, is integrated with an exterior casing for sealing use. The retainer can easy replace the components.

6 Claims, 8 Drawing Sheets

OMNIDIRECTIONAL VISUAL ANGLE SYSTEM AND RETAINER FOR THE SYSTEM

BACKGROUND OF THE INVENTION

The present invention relates to an omnidirectional visual angle system for observing the circumjacent environment in all directions of 360° and a retainer for the system.

In recent years, in the field of a visual angle sensor such as a monitor camera, there have been put into practice various trials to combine a camera with a computer so as to make the combination execute the work, which has conventionally been performed by a human being by his or her own sight. The camera, which is generally used in such a case, has a limited angle of visibility, and there are carried out trials to expand the angle of visibility by means of a wide-angle lens (fish-eye lens). Meanwhile, in the field of a mobile robot, there have been energetically conducted researches on utilizing a mirror having a surface of revolution (conic mirror, spherical mirror and so on) in order to expand the angle of visibility. These trials are to pick up a circumjacent optical image at an angle of visibility of 360° by means of a mirror having a surface of revolution, convert this image into a video image and subject the resulting image to a process of conversion into the desired image by means of a computer.

FIG. 8 schematically shows the retainer of a conventional omnidirectional visual angle system that employs a mirror having a surface of revolution. In FIG. 8 are shown an optical system 1 constructed of a mirror having a surface of revolution, a video pickup means 2 for converting an optical image from the mirror having a surface of revolution into a video image and a transparent support 3 for connecting and supporting the optical system 1 with the video pickup means 2 by means of a screw 4. The optical image obtained by the optical system 1 using the mirror having a surface of revolution such as a conic mirror or a spherical mirror is converted into a video signal by the video pickup means 2 and then transmitted to a signal processing means (not shown) of the subsequent stage by a cable 5.

In this case, the mirror having a surface of revolution of the optical system 1 and the video pickup means 2 are connected and supported by the transparent support 3. The reason that the connection and support is performed by the transparent support 3 is to prevent the optical image of the support itself from entering the pickup image. It is to be noted that the retainer of the optical system 1 and the video pickup means 2 in the omnidirectional visual angle system are indispensable in order to improve the picture quality while preventing the entry of moisture and dust from outside.

However, the retainer of the aforementioned conventional omnidirectional visual angle system has the problems as follows. That is, the retainer of the aforementioned conventional omnidirectional visual angle system prevents the entry of moisture and dust from outside, whereas it is not particularly intended to have a waterproof structure.

Therefore, if it is tried to use the omnidirectional visual angle system outdoors, then it is required to take additional waterproof measures. Then, in such a case, there are waterproof measures for enclosing the entire omnidirectional visual angle system including the mirror having a surface of revolution (optical system 1) and the video pickup means 2 within another protective device.

However, if the system is enclosed within another protective device as described above, then there is the problem that the entire system becomes bulky and the protection structure becomes double, disadvantageously attenuating the quantity of received light of the optical system 1 by comparison with the case where only the transparent support 3 exists. When waterproof measures are taken by sealing up a space between the video pickup means 2 and the transparent support 3 with resin or the like, then there is much trouble in dismounting the video pickup means 2 and in replacing a component such as a solid-state image pickup device located inside the video pickup means.

SUMMARY OF THE INVENTION

Accordingly, the present invention has the object of providing an omnidirectional visual angle system, which is compact without any double protective structure, easy to replace components, free of visual field interruption and provided with sufficient waterproof measures as well as a retainer for the system.

In order to achieve the above object, there is provided an omnidirectional visual angle system having an optical system, which includes a mirror having a surface of revolution for obtaining an omnidirectional image in a visual field region, and an image pickup device for picking up the image obtained by the optical system, comprising:

a retainer, which retains therein the optical system and the image pickup device and has a waterproof structure and whose side surface has at least partially omnidirectional transparency.

According to the above construction, there is provided the retainer, which internally integrally retains the optical system including the mirror having a surface of revolution and the image pickup device and has the waterproof structure. Therefore, the retainment structure of the optical system and the image pickup device and the exterior casing for sealing use are integrated with each other without any double structure, and this enables the compacting of the system and restrains the reduction in quantity of reception light of the optical system. Furthermore, the side surface of the retainer has at least partially omnidirectional transparency, and therefore, the omnidirectional visual field region is not interrupted.

In one embodiment of the present invention, the retainer is comprised of a top section, a body section and a bottom section, a portion that belongs to the body section and is located at least within a sight range of the mirror having a surface of revolution is transparent, and a portion connecting the top section with the body section and a portion connecting the body section with the bottom section have a waterproof function and a detachable connection structure.

According to the above construction, the retainer is constructed of the top section, the body section and the bottom section, and each connecting portion has the waterproof function and the detachable connection structure. Therefore, the retainer can easily be separated into the portions, facilitating the replacement and the like of the components such as the mirror having a surface of revolution and the image pickup device. Further, the portion that belongs to the body section and is located within the sight range of the mirror having a surface of revolution is transparent. Therefore, the sight range of the mirror having a surface of revolution is not interrupted.

In one embodiment of the present invention, the body section has a cylindrical shape and includes a fixture portion of the mirror having a surface of revolution at an end of the top section, and the bottom section is assembled with a mounting base for movably mounting the image pickup device along a center axis of the body section and with a fixture for fixing the image pickup device to the mounting base.

According to the above construction, the image pickup device is movably mounted on the bottom section along the center axis by means of the mounting base and the fixture. Therefore, the image pickup device can be moved with respect to the bottom section, and the distance between the mirror having a surface of revolution and the image pickup device can easily be varied.

In one embodiment of the present invention, the body section has a cylindrical shape, the top section is integrated with the mirror having a surface of revolution, and the bottom section is assembled with a mounting base for movably mounting the image pickup device along a center axis of the body section and with a fixture for fixing the image pickup device to the mounting base.

According to the above construction, the image pickup device can be moved with respect to the bottom section, and the distance between the mirror having a surface of revolution and the image pickup device can easily be varied. Furthermore, the mirror having a surface of revolution and the top section are integrated with each other. Therefore, the number of components to be assembled in the connection structure of the body section and the top section is reduced, allowing the separation and assembling to be simply performed.

In one embodiment of the present invention, the mirror having a surface of revolution has an outer peripheral edge to be brought in contact with an inner peripheral surface of the body section that has the cylindrical shape, the fixture has a cylindrical shape and an outer peripheral surface to be brought in contact with an inner peripheral surface of the body section that has the cylindrical shape, and optical axes of the mirror having a surface of revolution and the image pickup device coincide with each other.

According to the above construction, the optical axes of the mirror having a surface of revolution and the image pickup device coincide with each other, by which the omnidirectional visual angle system constituted by the mirror having a surface of revolution and the image pickup device brings its functions into full play.

In one embodiment of the present invention, the mirror having a surface of revolution is a hyperboloid mirror.

According to the above construction, the image in the omnidirectional visual field region can be easily securely picked up by the image pickup device.

Also, there is provided an omnidirectional visual angle system retainer, which is separated into a top section, a body section and a bottom section and in which a portion connecting the top section with the body section and a portion connecting the body section with the bottom section have a waterproof function and a detachable connection structure, the body section having at least partially omnidirectional transparency, the bottom section having a mounting base provided with a through hole that extends along a center axis of the body section, and an image pickup device being able to be movably mounted along the center axis on the mounting base of the bottom section by means of the fixture by utilizing the through hole.

According to the above construction, the body section partially has omnidirectional transparency, and therefore, the omnidirectional visual field region is not interrupted. Furthermore, by virtue of the arrangement separable into the top section, the body section and the bottom section, the replacement and the like of the components such as the image pickup device are facilitated. In addition, the image pickup device can be movably mounted on the bottom section. Therefore, the distance between the mirror having a surface of revolution to be mounted on the top section or the end of the body section and the image pickup device is made variable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
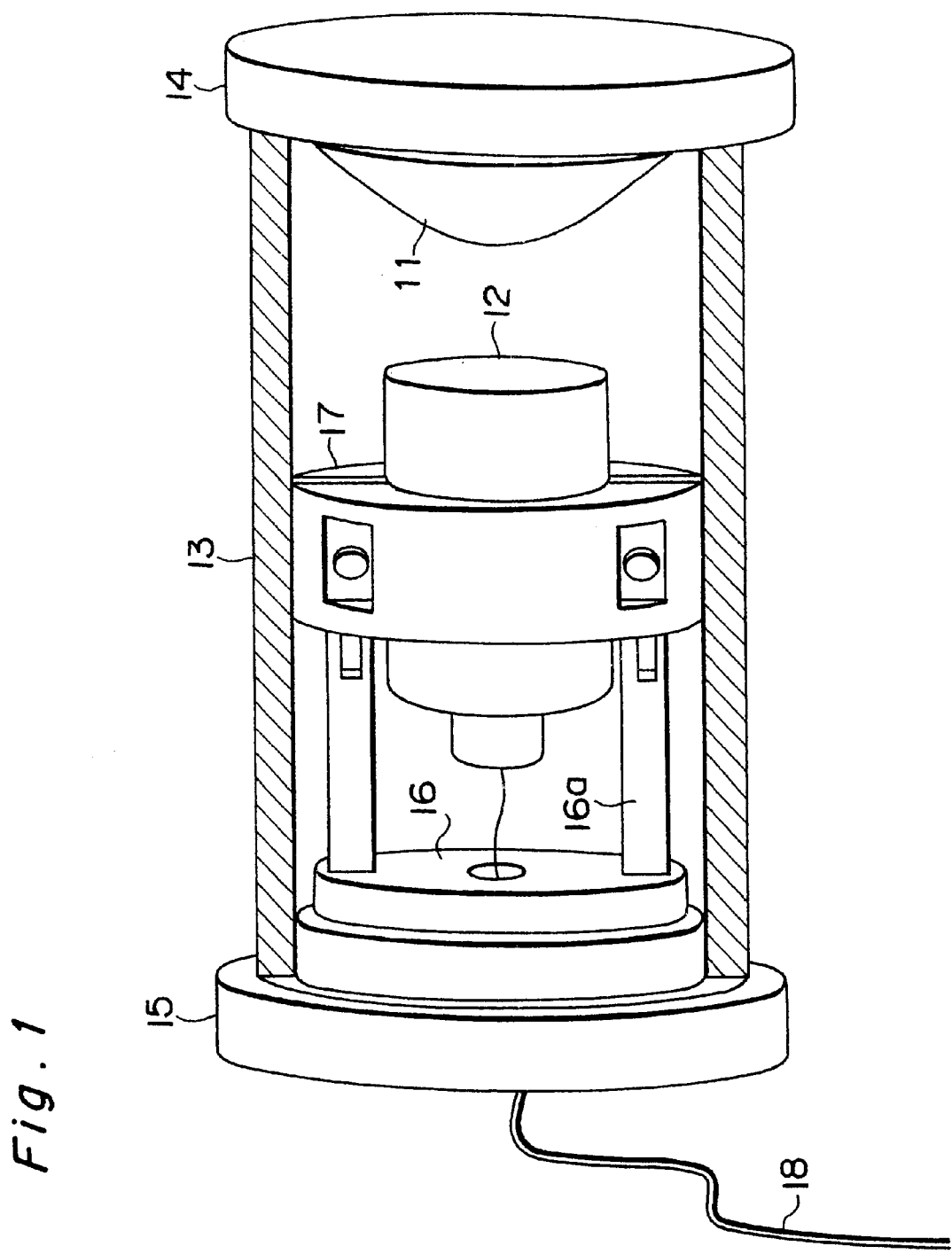
FIG. 1 is a structural view of an omnidirectional visual angle system according to the present invention.

The present invention will be described in detail below on the basis of the embodiments thereof shown in the drawings.

(First Embodiment)

FIG. 1 is a view showing the construction of an omnidirectional visual angle system according to the present embodiment. In FIG. 1 are shown a mirror having a surface of revolution 11, an image pickup device 12, a retainer body section 13, a retainer top section 14 and a retainer bottom section 15. A mounting base 16 is a base on which the image pickup device 12 is mounted movably with respect to the retainer bottom section 15. A fixture 17 attaches and fixes the image pickup device 12 to the mounting base 16. A cable 18 transmits an image signal from the image pickup device 12.

The retainer, which retains the mirror having a surface of revolution 11 and the image pickup device 12, is a cylindrical casing constructed of the retainer top section 14, the retainer body section 13 and the retainer bottom section 15. Regarding the retainer body section 13, a region located at least within the sight range of the mirror having a surface of revolution 11 is transparently made of a transparent resin of acrylic or the like or glass. Further, a portion connecting the retainer top section 14 with the retainer body section 13 and a portion connecting the retainer body sections 13 with the retainer bottom section 15 have a detachable connection mechanism (screwed mechanism) with interposition of an O-ring, providing a waterproof structure.

The mirror having a surface of revolution 11 is mounted on the end of the retainer body section 13. The retainer bottom section 15 is assembled with the mounting base 16, which can be mounted with the image pickup device 12 shifted in position, and with fixture members 16a and 16a of two plate-shaped bodies for attaching and fixing the image pickup device 12 to the mounting base 16. Further, the outer peripheral edge of the mirror having a surface of revolution 11 is brought in contact with the inner peripheral surface of the cylindrical retainer body section 13. The fixture 17 has a shape such that a cylinder is diametrically divided into halves. Two fixture members 17 and 17 are arranged face to face and screwed by screws to each other with interposition of the fixture members 16a and 16a. The screws are inserted through the through holes of the fixture members 16a and 16a. The two fixture members 17 and 17 form a cylinder in the state in which they are mounted on the mounting base 16, and their outer peripheral surfaces are brought in contact with the inner peripheral surface of the cylindrical retainer body section 13. With this arrangement, the optical axes of the mirror having a surface of revolution 11 and the image pickup device 12 are made to coincide with each other. It is to be noted that the thickness of the retainer body section 13 should preferably be as small as possible, and it is preferable to reduce the thickness to a minimum within a range in which strength can be maintained.

Figure 2:
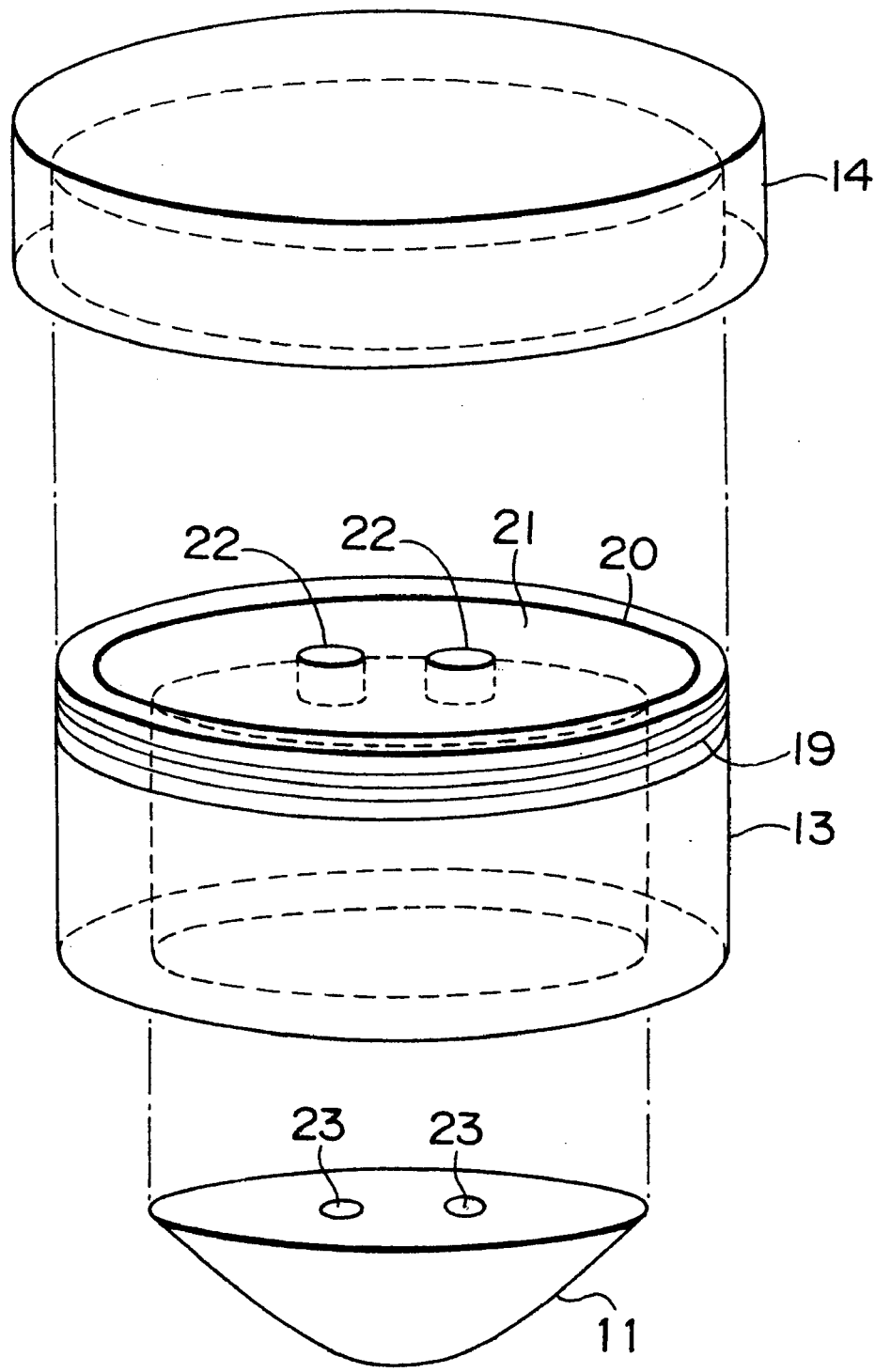
FIG. 2 is a view showing a structure for connecting a retainer body section with a retainer top section in FIG. 1.

FIG. 2 shows a structure for connecting the retainer body section 13 with the retainer top section 14. The retainer top section 14 is constructed so as to receive an end portion of the retainer body section 13 and is connected to the end portion of the retainer body section 13 by bringing a female thread (not shown) provided on its inner peripheral surface into meshing engagement with a male thread 19 provided on the outer peripheral surface of the end portion of the retainer body section 13. In the above case, a lid section 21 that closes the end portion of the retainer body section 13 and faces the retainer top section 14 is provided with a circular groove, and an O-ring 20 is buried. Further, the lid section 21 is provided with two screw holes 22 and 22 for mounting the mirror having a surface of revolution 11.

In the above construction, screw holes 23 and 23 of the mirror having a surface of revolution 11 are aligned in position with the two screw holes 22 and 22 of the lid section 21, and the mirror having a surface of revolution 11 is screwed to the lid section 21 of the retainer body section 13. In order to waterproof the screwed portions, the retainer top section 14 is screwed from above the lid section 21 of the retainer body section 13. In the above case, the O-ring 20 is buried around the lid section 21 of the retainer body section 13. By screwing the retainer top section 14 onto the retainer body section 13 so as to bring the lid section 21 and the retainer top section 14 into pressed contact with each other, the screw portions are waterproofed. Further, the outer diameter of the mirror having a surface of revolution 11 coincides with the inner diameter of the retainer body section 13, and the axis of rotation of the mirror having a surface of revolution 11 is set so as to extend the center axis of the retainer body section 13. With this arrangement, the optical axes of the mirror having a surface of revolution 11 and the image pickup device 12 can easily be made to coincide with each other.

Figure 3:
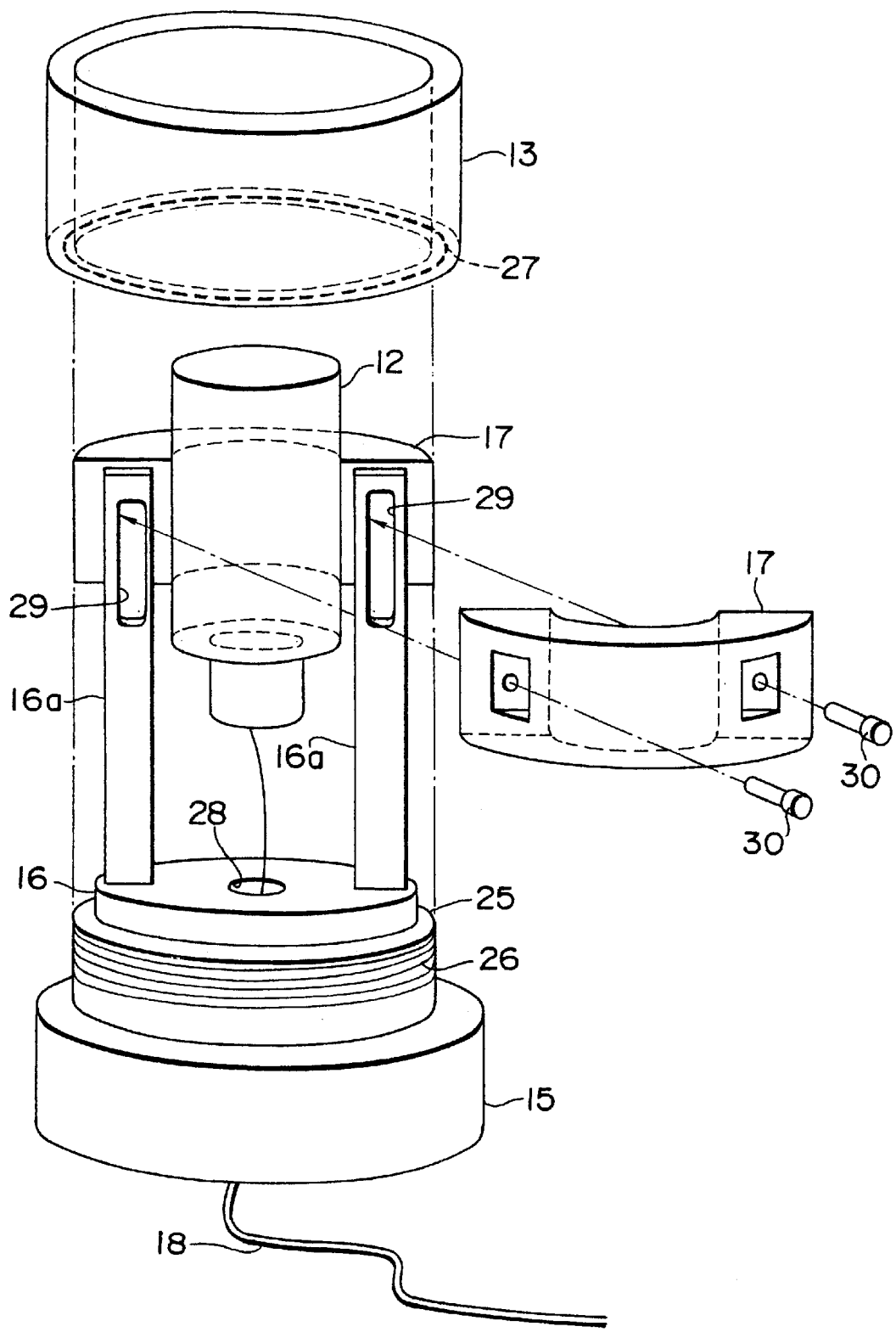
FIG. 3 is a view showing a structure for connecting the retainer body section and a retainer bottom section in FIG. 1.

FIG. 3 shows the structure for connecting the retainer body section 13 with the retainer bottom section 15. The retainer bottom section 15 is connected to the lower end portion of the retainer body section 13 by bringing a male thread 26 provided on the outer peripheral surface of its base 25 into meshing engagement with a female thread (not shown) provided on the inner peripheral surface of the lower end portion of the retainer body section 13. In the above case, a surface that belongs to the lower end portion of the retainer body section 13 and faces the retainer bottom section 15 is provided with a circular groove, and an O-ring 27 is buried. There is also provided a hole 28, which penetrates the mounting base 16 and the retainer bottom section 15 (base 25) along the center axis of the retainer body section 13 and through which the cable 18 for the image signal extends.

In the above construction, the retainer bottom section 15 is screwed to the retainer body section 13 by bringing the male thread 26 provided on the outer peripheral surface of the base 25 of the retainer bottom section 15 into meshing engagement with the female thread provided on the inner peripheral surface of the lower end portion of the retainer body section 13. In the above case, the O-ring 27 is buried in the end surface of the retainer body section 13. By screwing the retainer bottom section 15 into the retainer body section 13 so as to bring the retainer body section 13 and the retainer bottom section 15 into pressed contact with each other, the waterproof arrangement is provided.

Prior to the above process, the image pickup device 12 is attached and fixed to the mounting base 16 assembled into the retainer bottom section 15 by means of the fixture members 17 and 17. These fixture members 17 and 17 have a shape such that a cylinder is diametrically divided into halves and screwed to the fixture members 16a and 16a (i.e., to a mounting base 16) with screws 30 and 30 via through holes 29 and 29 provided for the fixture members 16a and 16a of the mounting base 16. In this state, the fixture members 17 and 17 are integrated with each other to form a cylinder and are constructed so that the outer peripheral surface of the cylindrical fixture 17 is brought in contact with the inner peripheral surface of the retainer body section 13 when inserted in the retainer body section 13. As a result, the optical axis of the image pickup device 12 is set so as to extend the center axis of the retainer body section 13. With this arrangement, the axis of rotation (optical axis) of the mirror having a surface of revolution 11 is set so as to coincide with the optical axis of the image pickup device 12.

Furthermore, the mounting position (screwing position) of the fixture 17 to be mounted on the fixture member 16a can be moved along the center axis of the retainer body section 13 within the length of the through hole 29 in a state in which the image pickup device 12 is mounted, and this arrangement allows the distance between the mirror having a surface of revolution 11 and the image pickup device 12 to be adjusted. Therefore, the image pickup device 12 can be adjusted in position while operating the system and fixed to the mounting base 16 after the determination of the position in this position. It is to be noted that the hole 28, which is provided for the cable 18 of the image pickup device 12 and formed through the mounting base 16 and the retainer bottom section 15, is sealed with resin after the cable 18 is put through the hole.

As described above, in the present embodiment, the retainer is constructed of the retainer top section 14, the retainer body section 13 and the retainer bottom section 15. The portions connecting the sections 13, 14 and 15 are screwed by the screws 19 and 26 with interposition of the O-rings 20 and 27, providing a detachable waterproof structure.

The mirror having a surface of revolution 11 can be mounted on the lid section 21 located on the top section side of the retainer body section 13. A portion that belongs to the side surface of the retainer body section 13 and corresponds to at least the sight range of the mirror having a surface of revolution 11 is made transparent. On the other hand, the retainer bottom section 15 is assembled with the mounting base 16 for movably mounting the image pickup device 12 and with the fixture 17 for fixing the image pickup device 12 to the fixture member 16a of the mounting base 16. The outer peripheral edge of the mirror having a surface of revolution 11 is brought in contact with the inner peripheral surface of the cylindrical retainer body section 13. On the other hand, the fixture 17 has a cylindrical shape, and its outer peripheral surface is brought in contact with the inner peripheral surface of the cylindrical retainer body section 13. Therefore, the optical axes of the mirror having a surface of revolution 11 and the image pickup device 12 coincide with each other, and this allows the provision of a retainer, which has a waterproof function and does not interrupt the visual field of the omnidirectional visual angle system and in which the retainer structure of the mirror having a surface of revolution 11 and the image pickup device 12 is integrated with the exterior casing for sealing.

As described above, the adoption of the structure in which the retainer of the rotator mirror 11 and the image pickup device 12 is integrated with the waterproof casing enables the compacting of the omnidirectional visual angle system having the waterproof function. The retainer can easily be separated, and therefore, the components such as the mirror having a surface of revolutions 11 and the image pickup device 12 can easily be replaced. In addition, the image pickup device 12 can be movably mounted on the mounting base 16 (i.e., the retainer bottom section 15), and therefore, the distance between the mirror having a surface of revolution 11 and the image pickup device 12 can be varied. Furthermore, the retainer body section 13, which is constructed of a straight pipe, can easily be manufactured.

The image pickup device 12 is fixed to the mounting base 16 by the cylindrical fixture 17 to be brought in contact with the cylindrical retainer body section 13. Therefore, the retainer body section 13 and so on can be employed without modification merely by changing the inner diameter of the fixture 17 (i.e., the thickness of the cylinder constituting the fixture 17) even if the outer diameter of the image pickup device 12 is varied.

(Second Embodiment)

Figure 4:
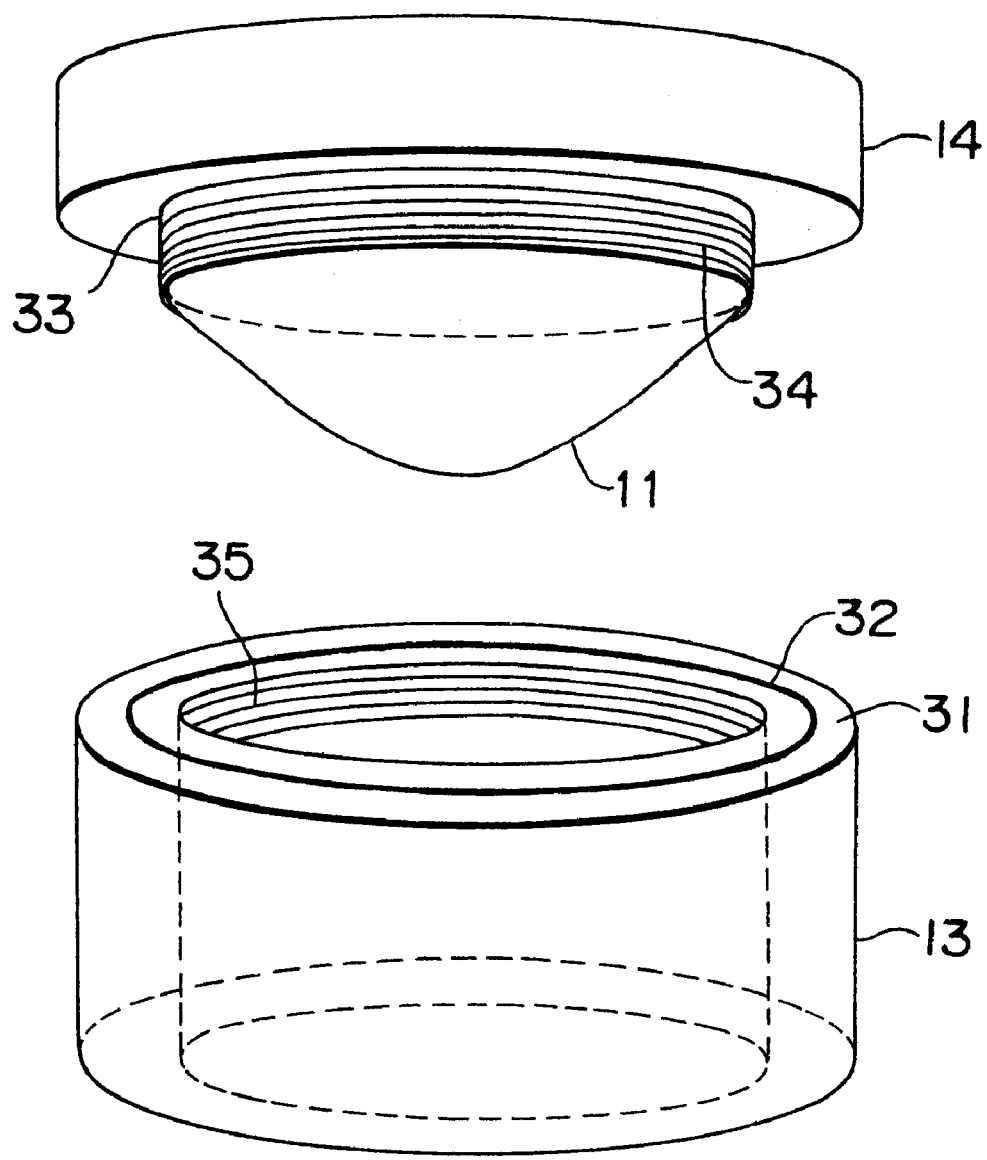
FIG. 4 is a view showing a structure for connecting a retainer body section and a retainer top section different from that of FIG. 2.

The present embodiment relates to a connection structure different from that of the retainer body section 13 and the retainer top section 14 of the first embodiment. In FIG. 4, there is no such lid section as that of the first embodiment at the end portion that belongs to the retainer body section 13 and is located on the retainer top section 14 side. Instead of the above construction, a circular groove is provided on an end surface 31, and an O-ring 32 is buried. A pedestal 33, which has an outer diameter and is able to be fit in the retainer body section 13, is provided on one side surface of the retainer top section 14, and the mirror having a surface of revolution 11 is mounted on this pedestal 33. That is, in the present embodiment, the mirror having a surface of revolution 11 is integrated with the retainer top section 14. The outer diameter of the mirror having a surface of revolution 11 is made equal to the outer diameter of the pedestal 33. Furthermore, a male thread 34 is provided on the outer peripheral surface of the pedestal 33 of the retainer top section 14, while a female thread 35 to be brought into meshing engagement with the male thread 34 is provided on the inner peripheral surface of the end portion of the retainer body section 13.

In the above construction, the retainer top section 14 provided with the integrated body of the pedestal 33 and the mirror having a surface of revolution 11 is to insert the pedestal 33 thereof into the retainer body section 13, with the male thread 34 of the retainer body section 13 brought into meshing engagement with the female thread 35 of the retainer body section 13. Then, by bringing an end surface, which belongs to the retainer top section 14 and is located outside the pedestal 33, into pressed contact with the end surface 31 of the retainer body section 13, the end surface of the retainer top section 14 is brought into intimate contact with an O-ring 32, providing a waterproof arrangement.

That is, in the present embodiment, by screwing the retainer top section 14 provided with the mirror having a surface of revolution 11 into the retainer body section 13, the waterproof arrangement is automatically provided. Furthermore, the mirror having a surface of revolution 11 is integrated with the retainer top section 14. The present embodiment has a reduced number of components in the connection structure of the retainer body section 13 and the retainer top section 14, making the separation and assembling of the retainer much simpler than that of the first embodiment.

Figure 5:
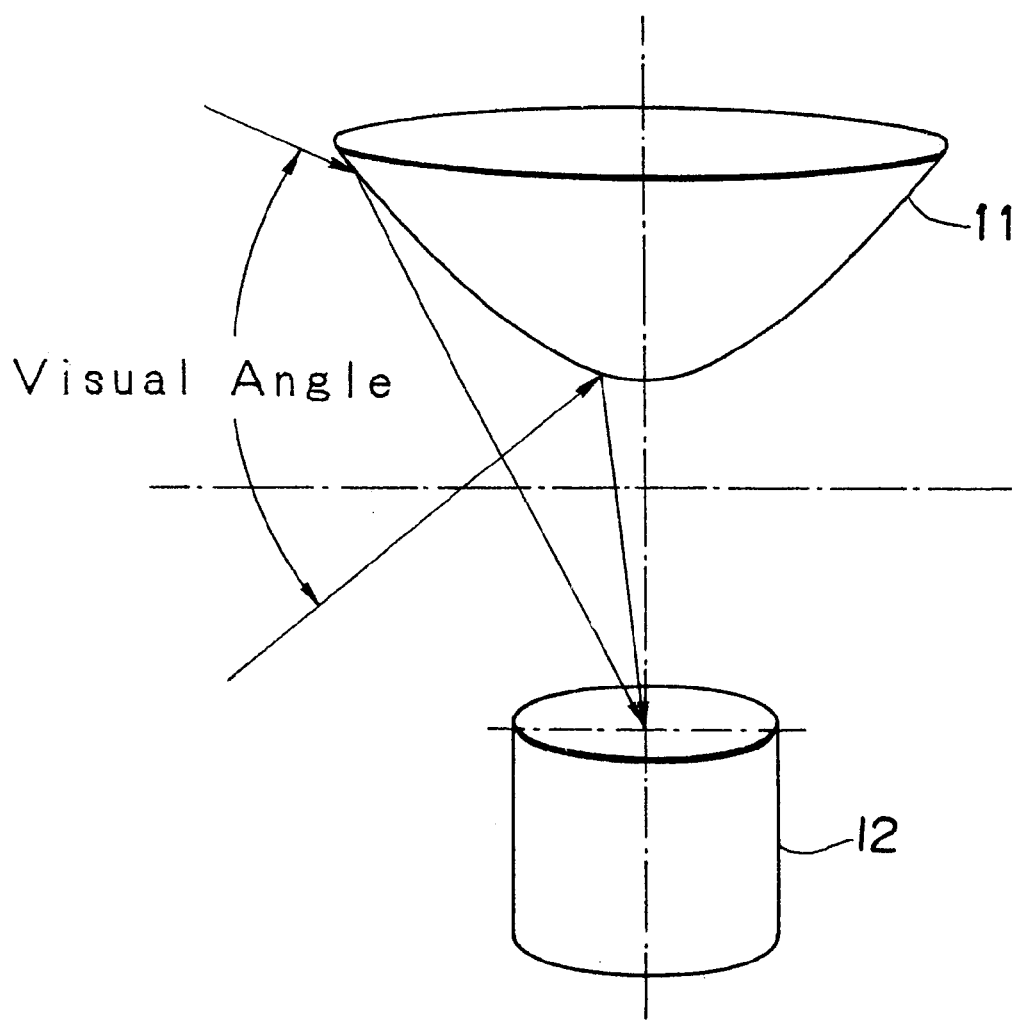
FIG. 5 is an explanatory view of a mirror having a surface of revolution and an image pickup device in FIG. 1.
Figure 6:
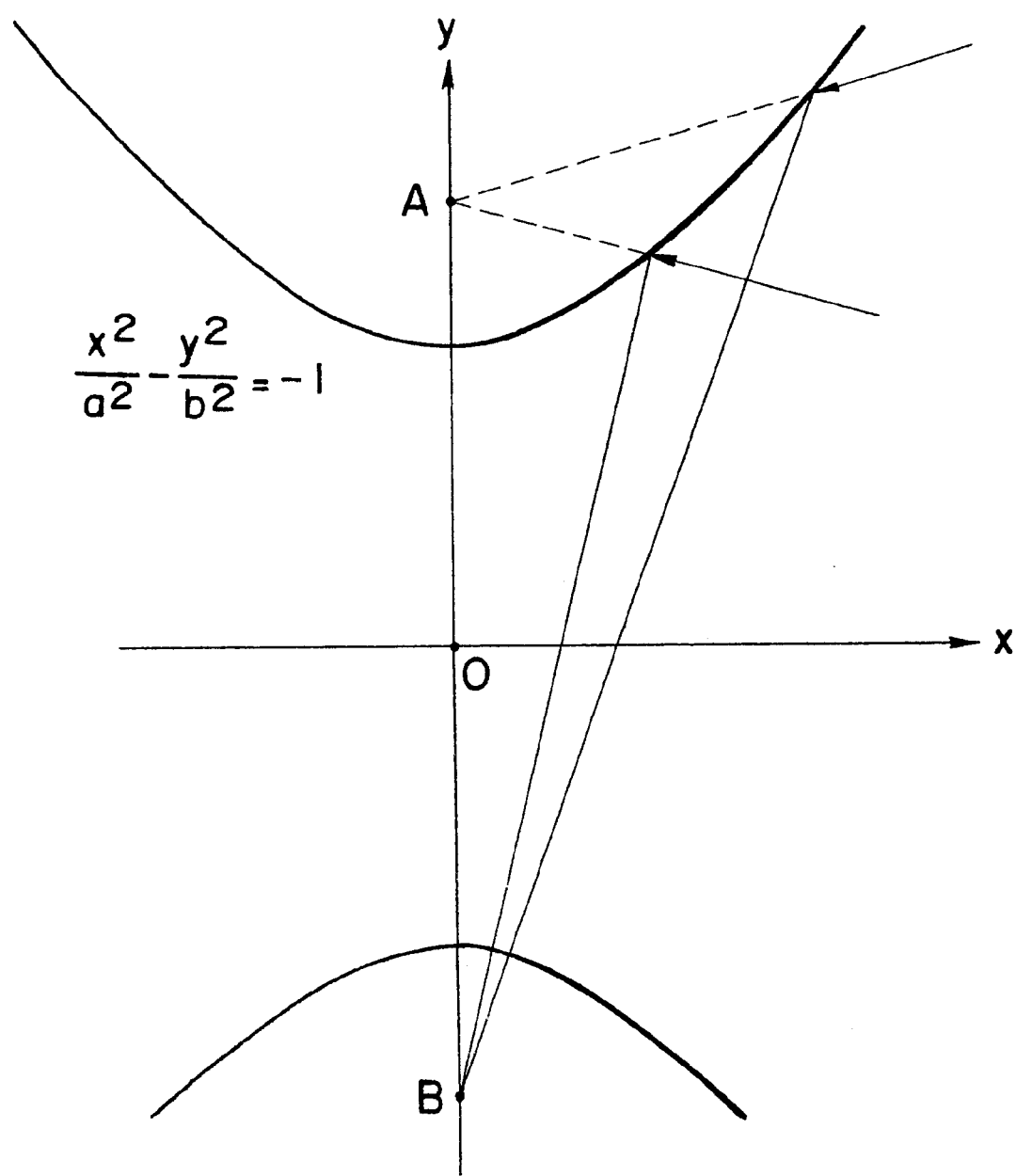
FIG. 6 is an explanatory view of a hyperboloid of two sheets.

The mirror having a surface of revolution 11 employed in each of the aforementioned embodiments is a hyperboloid mirror utilizing one hyperboloidal surface of a hyperboloid of two sheets as shown in FIG. 5. In this case, as shown in FIG. 6, the hyperboloid of two sheets is a curved surface obtained by rotating around the y-axis a curve of "$x^2/a^2 - y^2/b^2 = -1$" that has two focal points A and B at positions symmetrical about the origin on the y-axis. In this hyperboloid mirror formed to have a shape of the hyperboloidal surface located on the positive side of the hyperboloid of two sheets, light incident on the focal point A has a characteristic such that the light is reflected toward the focal point B of the hyperboloidal surface located on the negative side of the hyperboloid of two sheets.

Figure 7A:
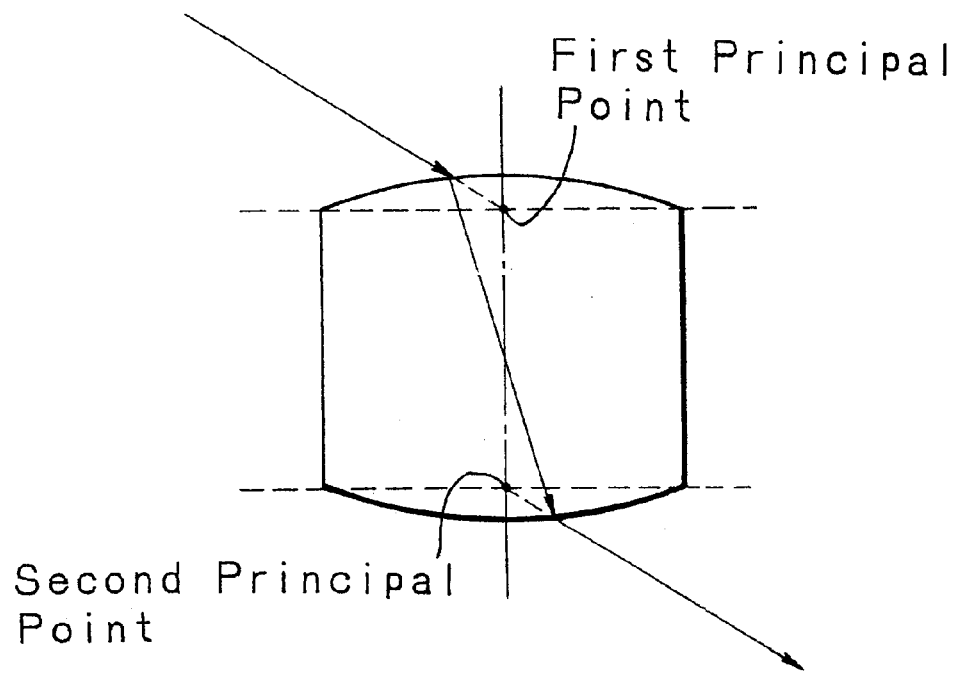
FIGS. 7A and 7B are explanatory views of a first principal point.
Figure 7B:
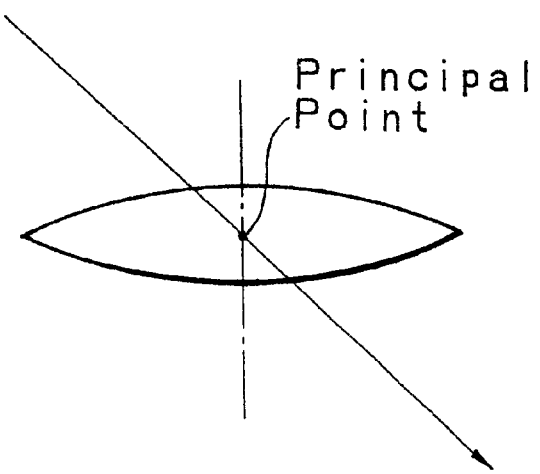
Figure 8:
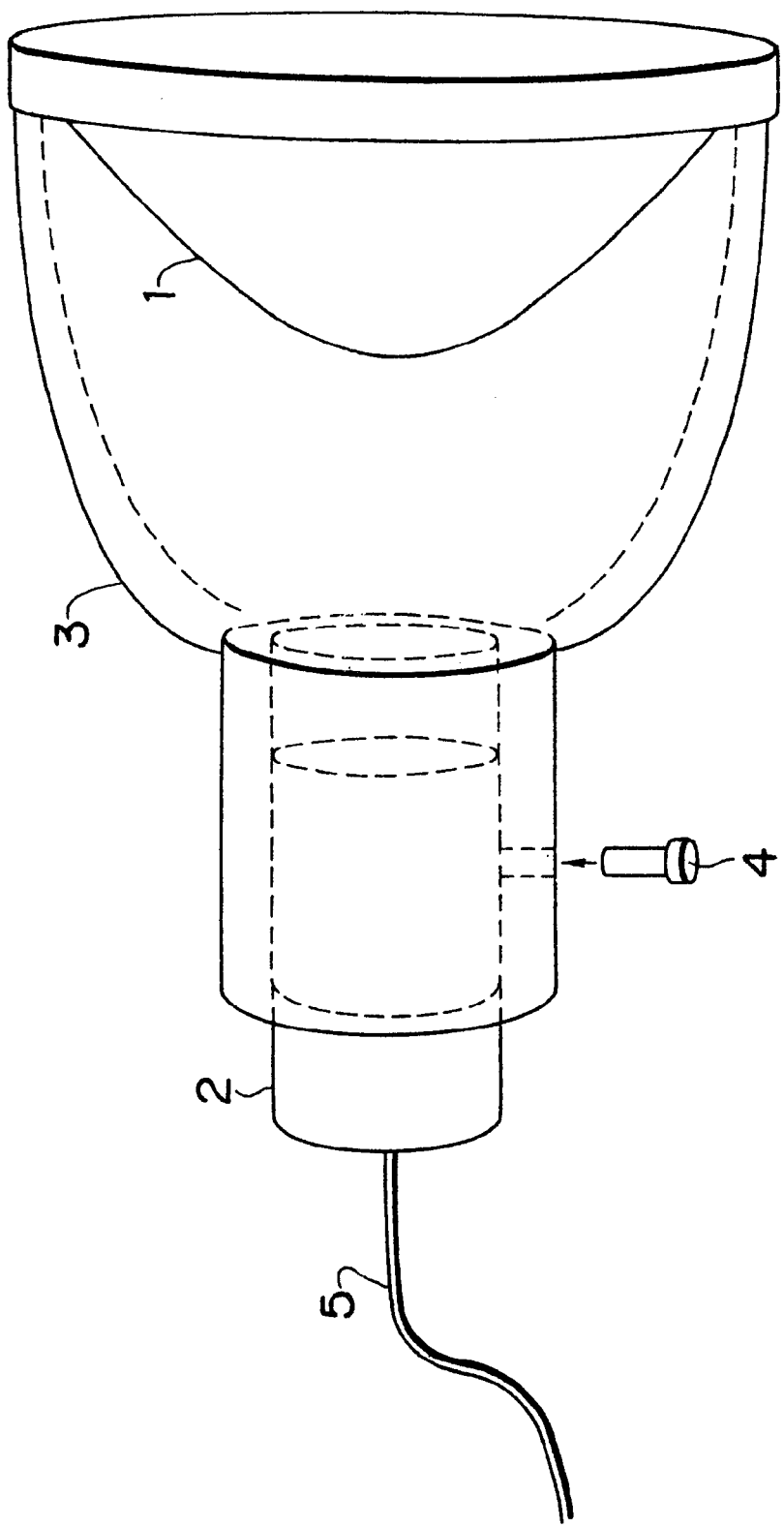
FIG. 8 is a view schematically showing a conventional omnidirectional visual angle system.

Accordingly, as shown in FIG. 5, the axis of rotation of the mirror having a surface of revolution 11 is made to coincide with the optical axis of the image pickup lens that constitutes the image pickup device (video camera) 12, and the first principal point of the image pickup lens is set at the position of the focal point B located on the negative side of the hyperboloid of two sheets. This arrangement enables the conversion of the central projection (meaning that the image picked up by the image pickup device 12 can be assumed as an image viewed from a viewpoint located at the position of the other focal point A of the hyperboloid mirror 11). In this case, as shown in FIG. 7A, the first principal point is a point where the direction of incidence of the incident light and the optical axis cross each other when the light incident on the lens and outgoing light from the lens are parallel to each other. In contrast to this, a point where the direction in which the outgoing light goes out apart from the lens and the optical axis cross each other is called the second principal point. As shown in FIG. 7B, if the first principal point and the second principal point are located at an identical point, then the point is simply called the principal point. It is to be noted that the details of the hyperboloid mirror optical system are described in Japanese Patent Laid-Open Publication No. HEI 6-295333.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An omnidirectional visual angle system having an optical system, which includes a mirror having a surface of revolution for obtaining an omnidirectional image in a visual field region, and an image pickup device for picking up the image obtained by the optical system, comprising:

a retainer, which retains therein the optical system and the image pickup device and has a waterproof structure and whose side surface has at least partially omnidirectional transparency;

the retainer is comprised of a top section, a body section and a bottom section;

a portion that belongs to the body section and is located at least within a sight range of the mirror having a surface of revolution is transparent, and a portion connecting the top section with the body section and a portion connecting the body section with the bottom section have a waterproof function and a detachable connection structure;

wherein the body section has a cylindrical shape and includes a fixture portion of the mirror having a surface of revolution at an end of the top section; and the bottom section is assembled with a mounting base for movably mounting the image pickup device along a center axis of the body section and with a fixture for fixing the image pickup device to the mounting base.

2. An omnidirectional visual angle system having an optical system, which includes a mirror having a surface of revolution for obtaining an omnidirectional image in a visual field region, and an image pickup device for picking up the image obtained by the optical system, comprising:

a retainer, which retains therein the optical system and the image pickup device and has a waterproof structure and whose side surface has at least partially omnidirectional transparency;

the retainer is comprised of a top section, a body section and a bottom section;

a portion that belongs to the body section and is located at least within a sight range of the mirror having a surface of revolution is transparent, and a portion connecting the top section with the body section and a portion connecting the body section with the bottom section have a waterproof function and a detachable connection structure;

wherein the body section has a cylindrical shape;

the top section is integrated with the mirror having a surface of evolution, and the bottom section is assembled with a mounting base for movably mounting the image pickup device along a center axis of the body section and with a fixture for fixing the image pickup device to the mounting base.

3. An omnidirectional visual angle system as claimed in claim 1, wherein the mirror having a surface of revolution has an outer peripheral edge to be brought in contact with an inner peripheral surface of the body section that has the cylindrical shape, the fixture has a cylindrical shape and an outer peripheral surface to be brought in contact with an inner peripheral surface of the body section that has the cylindrical shape, and optical axes of the mirror having a surface of revolution and the image pickup device coincide with each other.

4. An omnidirectional visual angle system as claimed in claim 1, wherein:

the mirror having a surface of revolution is a hyperboloid mirror.

5. An omnidirectional visual angle system retainer, which is separated into a top section, a body section and a bottom section and in which a portion connecting the top section with the body section and a portion connecting the body section with the bottom section have a waterproof function and a detachable connection structure, the body section having at least partially omnidirectional transparency, the bottom section having a mounting base provided with a through hole that extends along a center axis of the body section, and an image pickup device being able to be movably mounted along the center axis on the mounting base of the bottom section by means of the fixture by utilizing the through hole.

6. An omnidirectional visual angle system having an optical system, which includes a mirror having a surface of revolution for obtaining an omnidirectional image in a visual field region, and an image pickup device for picking up the image obtained by the optical system, comprising:

a retainer, which retains therein the optical system and the image pickup device and has a waterproof structure and whose side surface has at least partially omnidirectional transparency;

wherein the retainer has a top section and a bottom section both connected to a body section by means of screws and O rings are located between the body section and the top and bottom sections.

* * * * *